US012787009B2

(12) United States Patent
Echigo et al.

(10) Patent No.: US 12,787,009 B2
(45) Date of Patent: Nov. 3, 2026

(54) TERMINAL, RADIO COMMUNICATION SYSTEM, AND RADIO COMMUNICATION METHOD FOR DETERMINING A TRANSMIT DURATION IN AN UPLINK CHANNEL

(71) Applicant: NTT DOCOMO, INC., Tokyo (JP)

(72) Inventors: Haruhi Echigo, Tokyo (JP); Daisuke Kurita, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 268 days.

(21) Appl. No.: 18/701,334

(22) PCT Filed: Oct. 13, 2022

(86) PCT No.: PCT/JP2022/038261
§ 371 (c)(1),
(2) Date: Apr. 15, 2024

(87) PCT Pub. No.: WO2023/063397
PCT Pub. Date: Apr. 20, 2023

(65) Prior Publication Data

US 2025/0261196 A1 Aug. 14, 2025

(30) Foreign Application Priority Data

Oct. 15, 2021 (JP) ................................ 2021-169467

(51) Int. Cl.
*H04W 72/21* (2023.01)
*H04W 72/0446* (2023.01)

(52) U.S. Cl.
CPC ....... *H04W 72/21* (2023.01); *H04W 72/0446* (2013.01)

(58) Field of Classification Search
None
See application file for complete search history.

(56) References Cited

U.S. PATENT DOCUMENTS

2025/0056506 A1 * 2/2025 Shim ......................... H04L 1/08

OTHER PUBLICATIONS

"New WID on NR coverage enhancements", RP-202928, 3GPP TSG RAN meeting #90e, 3GPP, Dec. 2020, Cited in the specification.
Moderator (China Telecom.), "FL Summary of joint channel estimation for PUSCH" [online]. 3GPP TSG RAN WGI #106b-e RI-2109250. Oct. 13, 2021, Cited in the ISR issued on Dec. 13, 2022.
Interdigital, Inc. "Joint channel estimation for PUSCH" [online]. 3GPP TSG RAN WG1 #106b-e RI-2110154. Oct. 2, 2021, Cited in the ISR issued on Dec 13, 2022.
International Search Report of a international application PCT/JP2022/038261 mailed on Dec. 13, 2022.

* cited by examiner

*Primary Examiner* — Anh Ngoc M Nguyen
(74) *Attorney, Agent, or Firm* — METROLEX IP LAW GROUP, PLLC; Robert L. Scott, Esq.

(57) ABSTRACT

A terminal repeatedly transmits an uplink channel in a specific duration greater than or equal to a plurality of slots, and controls transmission of the uplink channel. When the specific duration is not indicated, the terminal determines a length of the specific duration on the basis of a number of transmissions of the uplink channel or a number of slots allocated for the uplink channel.

3 Claims, 11 Drawing Sheets

IN THE CASE OF Window length = 2

IN THE CASE OF Opt1, duration per hop = 2, and
FREQUENCY HOPPING WITH ODD SLOT NUMBERS

TERMINAL, RADIO COMMUNICATION SYSTEM, AND RADIO COMMUNICATION METHOD FOR DETERMINING A TRANSMIT DURATION IN AN UPLINK CHANNEL

TECHNICAL FIELD

The present disclosure relates to a terminal, a radio communication system, and a radio communication method, supporting coverage enhancement.

BACKGROUND ART

The 3rd Generation Partnership Project (3GPP) has prepared a specification for the 5th generation mobile communication system (also called 5G, New Radio (NR), or Next Generation (NG)) and is also preparing next generation specifications called Beyond 5G, 5G Evolution, or 6G.

For example, in 3GPP Release-17, it has been agreed to consider coverage enhancement (CE) in NR (Non-Patent Literature 1).

CITATION LIST

Non-Patent Literature

Non-Patent Literature 1: "New WID on NR coverage enhancements", RP-202928, 3GPP TSG RAN meeting #90e, 3GPP, December 2020

SUMMARY OF THE INVENTION

As a slot configuration pattern of time-division duplexing (TDD), DDDSU (D: downlink (DL) symbol, S: DL/uplink (UL) or guard symbol, U: UL symbol) is specified, and when the S slot is 10D+2G+2U, 2 symbols (2U) and 1 slot (14 symbols) which are continuous in the time direction can be used for a UL, that is, multiple slots which are continuous can be used for a UL.

Thus, in such a case, a channel estimation of an uplink channel (UL channel) such as a PUSCH (Physical Uplink Shared Channel) using a Demodulation Reference Signal (DMRS) that can be present in multiple slots (which may be called a joint channel estimation) has been considered.

In the case of a joint channel estimation of a PUSCH, it is necessary to design a duration (TDW: Time Domain Window) in which a radio base station (gNB) transmits a signal while maintaining continuity of power and a phase in order to perform a channel estimation across multiple slots.

Thus, the following disclosure is made in view of such a situation and is intended to provide a terminal, a radio communication system, and a radio communication method capable of more efficiently performing a channel estimation of an uplink channel such as a PUSCH using a DMRS that can be present in multiple slots.

An aspect of the present disclosure is a terminal (UE 200) including a transmission unit (radio signal transmission and reception unit 210) that repeatedly transmits an uplink channel in a specific duration greater than or equal to a plurality of slots, and a control unit (control unit 270) that controls transmission of the uplink channel, wherein when the specific duration is not indicated, the control unit determines a length of the specific duration on the basis of a number of transmissions of the uplink channel or a number of slots allocated for the uplink channel.

An aspect of the present disclosure is a terminal including a transmission unit that repeatedly transmits an uplink channel in a specific duration greater than or equal to a plurality of slots, and a control unit that controls transmission of the uplink channel, wherein the control unit determines, on the basis of a length of the specific duration, a resource block to be used in hopping in a frequency direction of the uplink channel.

An aspect of the present disclosure is a terminal including a transmission unit that repeatedly transmits an uplink channel in a specific duration greater than or equal to a plurality of slots, and a control unit that controls transmission of the uplink channel, wherein the control unit determines at least one of a start position or an end position of the specific duration on the basis of a resource block to be used in hopping in a frequency direction of the uplink channel.

An aspect of the present disclosure is a terminal including a transmission unit that repeatedly transmits an uplink channel in a specific duration greater than or equal to a plurality of slots, and a control unit that controls transmission of the uplink channel, wherein the control unit starts the specific duration on a first transmission occasion of the uplink channel or at a timing of an initial transmission of the uplink channel.

An aspect of the present disclosure is a radio communication system including a terminal, and a radio base station, wherein the terminal includes a transmission unit that repeatedly transmits an uplink channel in a specific duration greater than or equal to a plurality of slots, and a control unit that controls transmission of the uplink channel, when the specific duration is not indicated, the control unit determines a length of the specific duration on the basis of a number of transmissions of the uplink channel or a number of slots allocated for the uplink channel, and the radio base station includes a reception unit that receives the uplink channel.

An aspect of the present disclosure is a radio communication method including a step of repeatedly transmitting by a terminal an uplink channel in a specific duration greater than or equal to a plurality of slots, and a step of determining by the terminal, when the specific duration is not indicated, a length of the specific duration on the basis of a number of transmissions of the uplink channel or a number of slots allocated for the uplink channel.

DESCRIPTION OF EMBODIMENTS

Figure 1:
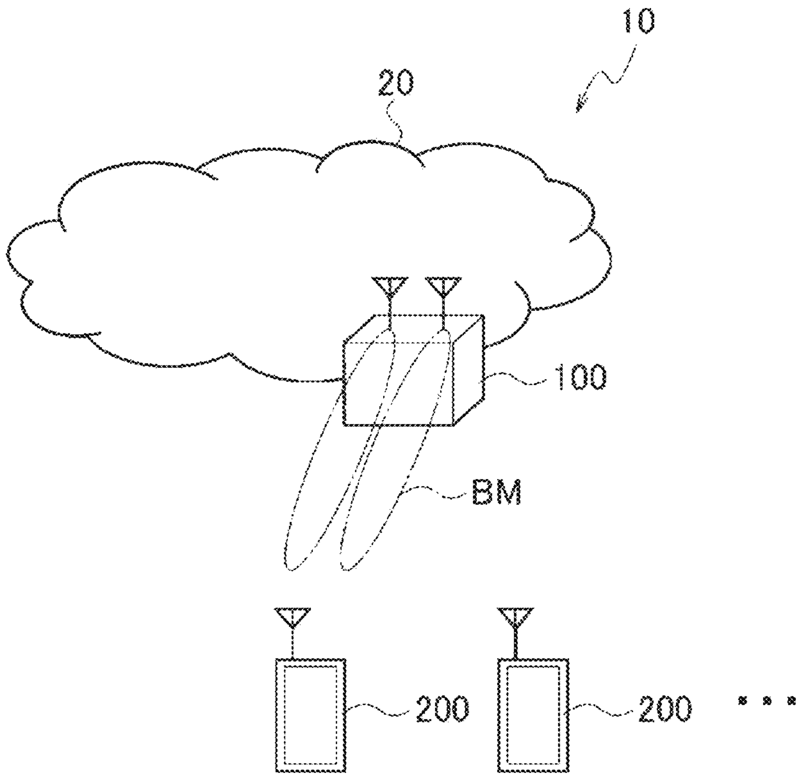
FIG. 1 is an overall schematic configuration diagram of a radio communication system 10.

Embodiments will be described below with reference to the drawings. Note that the same or similar reference numerals have been attached to the same functions and configurations, and the description thereof is omitted as appropriate.

(1) Overall Schematic Configuration of the Radio Communication System

FIG. 1 is an overall schematic configuration diagram of a radio communication system 10 according to the present embodiment. The radio communication system 10 is a 5G New Radio (NR) compliant radio communication system and includes a next generation-radio access network 20 (hereinafter, NG-RAN 20) and a terminal 200 (user equipment 200, hereinafter, UE 200).

Note that the radio communication system 10 may be compliant with a radio communication system called Beyond 5G, 5G Evolution, or 6G.

The NG-RAN 20 includes a radio base station 100 (hereinafter, gNB 100). Note that the specific configuration of the radio communication system 10 including the number of the gNBs and the UEs is not limited to the example in FIG. 1.

The NG-RAN 20 actually includes multiple NG-RAN Nodes, specifically gNBs (or ng-eNBs), and is connected to a 5g-compliant core network (5GC, not shown). Note that the NG-RAN 20 and 5 GC may be expressed simply as a "network".

The gNB 100 is a NR-compliant radio base station and performs radio communication with the UE 200 according to NR. The gNB 100 and the UE 200 can support Massive MIMO generating a beam BM with higher directivity by controlling radio signals transmitted from multiple antenna elements, a Carrier Aggregation (CA) bundling and using multiple Component Carriers (CCs), Dual Connectivity (DC) performing simultaneous communication between the UE and each of the multiple NG-RAN Nodes, and the like.

The radio communication system 10 supports FR1 and FR2. The frequency bands of the FRs (Frequency Ranges) are as follows.

FR1: 410 MHz to 7.125 GHZ

FR2: 24.25 GHz to 52.6 GHZ

FR1 may use a Sub-Carrier Spacing (SCS) of 15, 30, or 60 kHz and a bandwidth (BW) of 5 to 100 MHz. FR2 has a higher frequency than FR1 and may use an SCS of 60 or 120 kHz (240 kHz may be included) and a bandwidth (BW) of 50 to 400 MHz.

In addition, the radio communication system 10 may support a frequency band higher than that of FR2. Specifically, the radio communication system 10 can support a frequency band above 52.6 GHZ and up to 114.25 GHZ.

In addition, Cyclic Prefix-Orthogonal Frequency Division Multiplexing (CP-OFDM)/Discrete Fourier Transform-Spread (DFT-S-OFDM) having a larger Sub-Carrier Spacing (SCS) may be applied. Furthermore, DFT-S-OFDM may be applied for a downlink (DL) as well as an uplink (UL).

Figure 2:
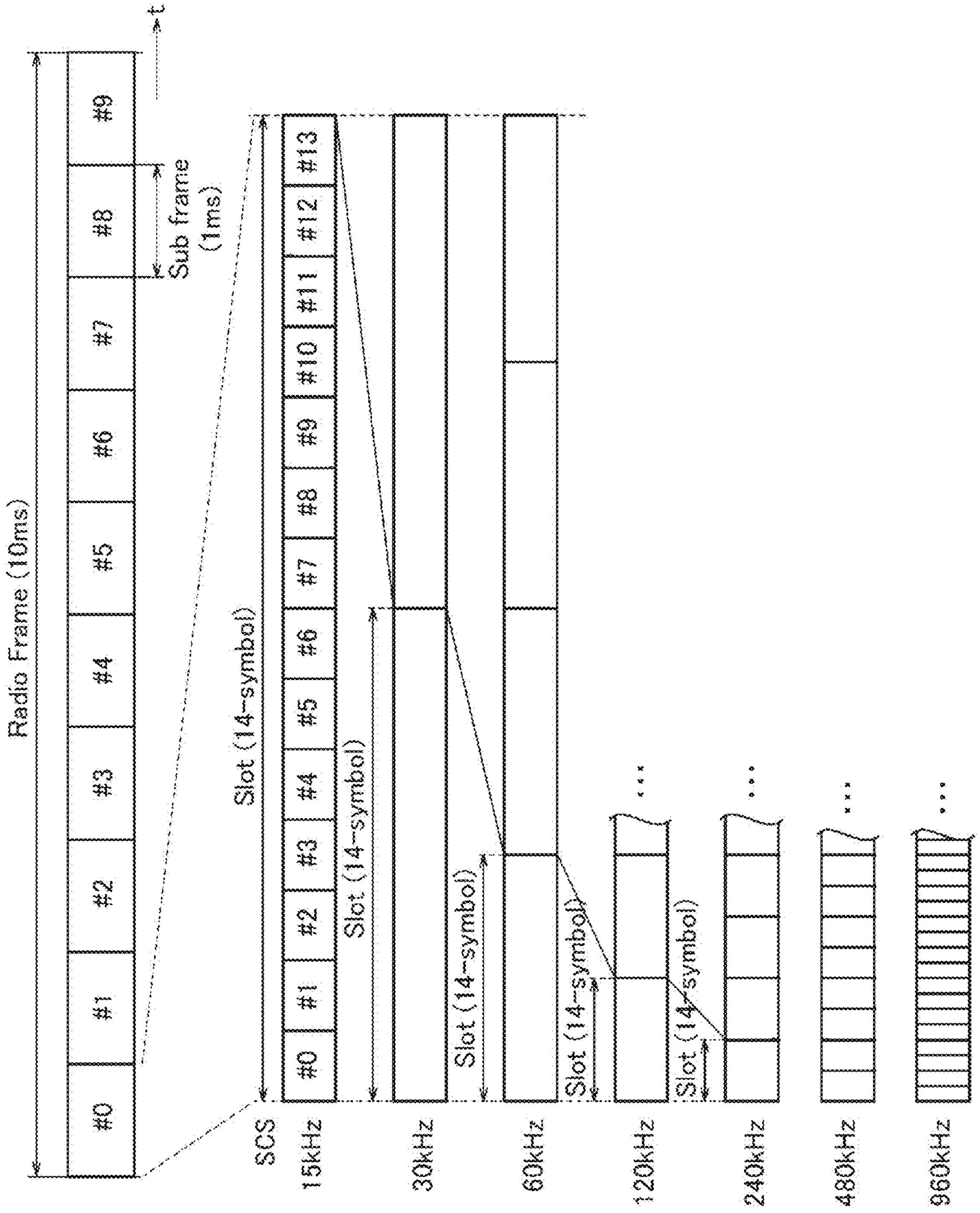
FIG. 2 is a diagram illustrating a configuration example of a radio frame, sub-frames, and slots used in the radio communication system 10.

FIG. 2 illustrates a configuration example of a radio frame, sub-frames, and slots used in the radio communication system 10.

As illustrated in FIG. 2, a slot consists of 14 symbols, and the symbol length (and the slot length) gets shorter as the SCS gets larger (wider). Note that the number of symbols constituting one slot does not necessarily have to be 14 (it may be 28 or 56 symbols). In addition, the number of slots per sub-frame may differ depending on the SCS. Furthermore, the SCS may be wider than 240 kHz (as illustrated in FIG. 2, it may be 480 kHz or 960 kHz).

Note that a time direction (t) in FIG. 2 may be called a time domain, a symbol length, a symbol time, or the like. A frequency direction may be called a frequency domain, a resource block, a resource block group, a subcarrier, a Band width part (BWP), a subchannel, a common frequency resource, or the like.

The radio communication system 10 can support a Coverage Enhancement (CE) that increases the coverage of a cell (or physical channel) formed by the gNB 100. The Coverage Enhancement may only provide a mechanism for increasing the reception success percentage of various physical channels.

For example, the gNB 100 can support a repetition transmission of a PDSCH (Physical Downlink Shared Channel), and the UE 200 can support a repetition transmission of a PUSCH (Physical Uplink Shared Channel).

In the radio communication system 10, a Slot Configuration pattern of Time-Division Duplexing (TDD) may be configured. For example, DDDSU (D: downlink (DL) symbol, S: DL/uplink (UL) or guard symbol, U: UL symbol) may be specified (see 3GPP TS38.101-4).

"D" indicates a slot in which all symbols are DL symbols, and "S" indicates a slot that mixedly contains a DL symbol, a UL symbol, or a guard symbol (G). "U" indicates a slot in which all symbols are UL symbols.

In the radio communication system 10, a channel estimation of a PUSCH (or a PUCCH (Physical Uplink Control Channel)) can be performed using a demodulation reference signal (DMRS) for each slot, and further, a channel estimation of a PUSCH (or a PUCCH) can be performed using a DMRS allocated to each of multiple slots. Such a channel estimation may be called a joint channel estimation. Alternatively, it may be called something else such as a cross-slot channel estimation.

The UE 200 can transmit a DMRS allocated to (extended across) multiple slots in such a manner that the gNB 100 can perform joint channel estimation using the DMRS.

In the radio communication system 10, regarding coverage enhancement, TB processing over multi-slot PUSCH (TBoMS) for processing a transport block (TB) via a PUSCH allocated to multiple slots may also be applied.

In TBoMS, the number of symbols allocated may be the same in each slot as in time domain resource allocation (TDRA) for PUSCH Repetition type A (described below in detail), or the number of symbols allocated to each slot may be different as in TDRA for PUSCH Repetition type B (described below in detail).

TDRA may be interpreted as resource allocation in a PUSCH time domain as specified in 3GPP TS38.214. TDRA for a PUSCH may be interpreted as specified by an information element (IE) of a Radio Resource Control layer (RRC), specifically PDSCH-Config or PDSCH-ConfigCommon.

TDRA may also be interpreted as a resource allocation in a PUSCH time domain specified by downlink control information (DCI).

(2) Functional Block Configuration of the Radio Communication System

Figure 3:
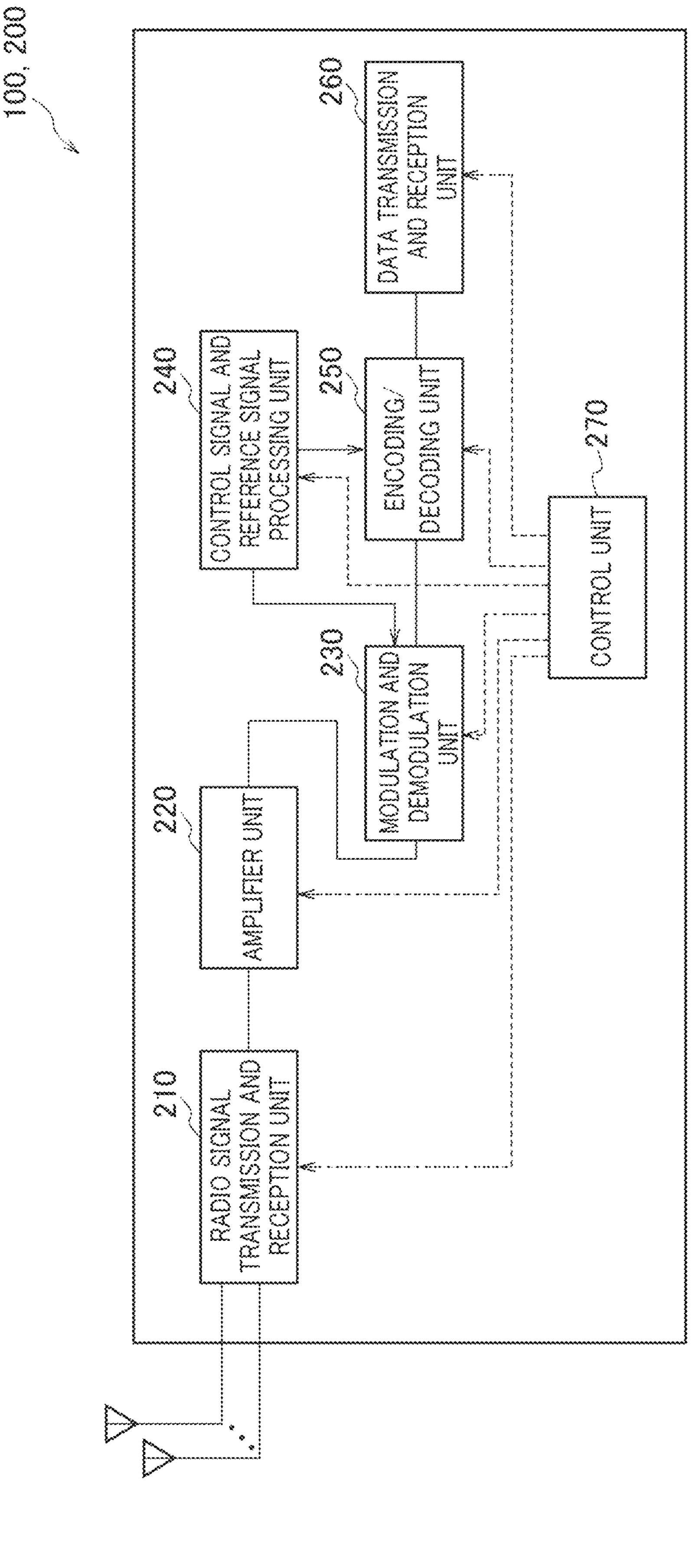
FIG. 3 is a functional block configuration diagram of a gNB 100 and a UE 200.

Next, a functional block configuration of the radio communication system 10 will be described. Specifically, a functional block configuration of the UE 200 will be described. FIG. 3 is a functional block configuration diagram of the gNB 100 and the UE 200.

As illustrated in FIG. 3, the UE 200 includes a radio signal transmission and reception unit 210, an amplifier unit 220, a modulation and demodulation unit 230, a control signal and reference signal processing unit 240, an encoding/decoding unit 250, a data transmission and reception unit 260, and a control unit 270.

Note that FIG. 3 illustrates only the main functional blocks related to the description of the embodiment, and the UE 200 (gNB 100) has other functional blocks (for example, a power supply unit). FIG. 3 also illustrates the functional block configuration of the UE 200. See FIG. 11 for the hardware configuration.

The radio signal transmission and reception unit 210 transmits and receives radio signals in accordance with NR. The radio signal transmission and reception unit 210 can support Massive MIMO generating a beam BM with higher directivity by controlling radio (RF) signals transmitted from multiple antenna elements, a Carrier Aggregation (CA) bundling and using multiple Component Carriers (CCs), Dual Connectivity (DC) performing simultaneous communication between the UE and each of the multiple NG-RAN Nodes, and the like.

The radio signal transmission and reception unit 210 may also transmit a physical uplink shared channel. In the present embodiment, the radio signal transmission and reception unit 210 may constitute a transmission unit.

Specifically, the radio signal transmission and reception unit 210 may transmit a PUSCH to a network (gNB 100). The radio signal transmission and reception unit 210 may support a PUSCH repetition transmission (Repetition).

Multiple types of PUSCH repetition transmission may be specified. Specifically, Repetition type A and Repetition type B may be specified. Repetition type A may be interpreted as a form in which a PUSCH allocated in a slot is repeatedly transmitted. That is, the PUSCH has 14 or fewer symbols, and there is no possibility of being allocated across multiple slots (adjacent slots).

In contrast, Repetition type B may be interpreted as a repetition transmission of a PUSCH for which more than 15 symbols may be allocated. In the present embodiment, it is acceptable to allocate such a PUSCH across multiple slots.

In addition, the radio signal transmission and reception unit 210 may repeatedly transmit an uplink channel (UL channel) in a specific duration greater than or equal to multiple slots. The uplink channel may include a Physical Uplink Shared Channel (PUSCH) and a Physical Uplink Control Channel (PUCCH).

The shared channel may be called a data channel.

The specific duration greater than or equal to multiple slots may be interpreted as a duration regarding the repetition of a PUSCH (or PUCCH). For example, the specific duration may be indicated by the number of repetitions, or may be the time at which a specific number of repetitions are performed. The specific duration may also be called a Time Domain Window (TDW). The TDW may be interpreted as a duration in which the gNB 100 transmits a signal while maintaining continuity of power and phase in order to perform channel estimation across multiple slots.

Alternatively, the radio signal transmission and reception unit 210 may repeatedly transmit a UL channel a specific number of times. Specifically, the radio signal transmission and reception unit 210 may repeatedly transmit a PUSCH (or PUCCH) multiple times.

The specific duration and/or the specific number of times may be indicated by a signaling from the network (may be of a higher layer of RRC or a lower layer such as DCI, hereinafter the same), or may be configured in advance in the UE 200.

The amplifier unit 220 includes a PA (Power Amplifier)/an LNA (Low Noise Amplifier), or the like. The amplifier unit 220 amplifies the signal output from the modulation and demodulation unit 230 to a predetermined power level. The amplifier unit 220 also amplifies the RF signal output from the radio signal transmission and reception unit 210.

The modulation and demodulation unit 230 performs data modulation/demodulation, transmission power configuration, resource block allocation, and the like for each predetermined communication destination (gNB 100 or the like). In the modulation and demodulation unit 230, Cyclic Prefix-Orthogonal Frequency Division Multiplexing (CP-OFDM) or Discrete Fourier Transform-Spread (DFT-S-OFDM) may be applied. DFT-S-OFDM may also be used for a downlink (DL) as well as an uplink (UL).

The control signal and reference signal processing unit 240 performs processing regarding various control signals transmitted and received by the UE 200 and processing regarding various reference signals transmitted and received by the UE 200.

Specifically, the control signal and reference signal processing unit 240 receives various control signals transmitted from the gNB 100 via a predetermined control channel, for example, a control signal of a Radio Resource Control (RRC) layer. The control signal and reference signal processing unit 240 also transmits various control signals to the gNB 100 through a predetermined control channel.

The control signal and reference signal processing unit 240 performs processing using a Reference Signal (RS) such as a Demodulation Reference Signal (DMRS) and a Phase Tracking Reference Signal (PTRS).

A DMRS is a terminal-specific reference signal (pilot signal), known between a base station and a terminal for estimating a fading channel used for data demodulation. A PTRS is a terminal-specific reference signal for the purpose of estimating phase noise, which becomes an issue in a high frequency band.

Note that the reference signal may include a Channel State Information-Reference Signal (CSI-RS), a Sounding Reference Signal (SRS), and a Positioning Reference Signal (PRS) for location information, in addition to the DMRS and PTRS.

The channel includes a control channel and a data channel. The control channel may include a PDCCH (Physical Downlink Control Channel), a PUCCH (Physical Uplink Control Channel), an RACH (Random Access Channel), Downlink Control Information (DCI) including a Random Access Radio Network Temporary Identifier (RA-RNTI), a Physical Broadcast Channel (PBCH), and the like.

The data channel includes a PDSCH (Physical Downlink Shared Channel), a PUSCH (Physical Uplink Shared Channel), and the like. Data here may mean data that is transmitted via a data channel.

In addition, the control signal and reference signal processing unit 240 may transmit, to the network, capability information of the UE 200 regarding the allocation of a Physical Uplink Shared Channel (PUSCH). In the present embodiment, the control signal and reference signal processing unit 240 may constitute a transmission unit for transmitting capability information.

Specifically, the control signal and reference signal processing unit 240 can transmit, to the gNB 100, UE Capability Information regarding the allocation of a PUSCH (which may include repetition). Note that the details of UE Capability Information will be described below.

The encoding/decoding unit 250 performs data division/connection, channel coding/decoding, and the like for each predetermined communication destination (gNB 100 or another gNB).

Specifically, the encoding/decoding unit 250 divides the data output from the data transmission and reception unit 260 into predetermined sizes and performs channel coding on the divided data. The encoding/decoding unit 250 also decodes the data output from the modulation and demodulation unit 230 and connects the decoded data.

The data transmission and reception unit 260 performs transmission and reception of Protocol Data Units (PDU) and Service Data Units (SDU). Specifically, the data transmission and reception unit 260 performs assembly, disassembly, and the like of PDUs/SDUs in multiple layers (Medium Access Control (MAC) layer, Radio Link Control (RLC) layer, Packet Data Convergence Protocol (PDCP) layer, and the like). The data transmission and reception unit 260 also performs error correction and retransmission control of data on the basis of a hybrid ARQ (hybrid automatic repeat request).

The control unit 270 controls each of the functional blocks configuring the UE 200. In particular, in the present embodiment, the control unit 270 controls transmission of a UL channel, specifically, PUSCH and PUCCH.

Specifically, the control unit 270 can cause a UL channel to hop in the frequency direction in units of a specific duration greater than or equal to multiple slots. The hopping of the UL channel in the frequency direction may be called frequency hopping, and the frequency hopping in units of a specific duration greater than or equal to multiple slots may be called inter-slot frequency hopping. Note that the hopping may mean that a frequency resource to be used changes. In short, it may mean that a subcarrier, a resource block, a resource block group, or a BWP changes.

The control unit 270 may also cause a UL channel to hop in the frequency direction in units of a specific number of times indicating the number of repetition transmission of the UL channel. Specifically, the control unit 270 may perform frequency hopping in units of the specific number of repetition transmission (number of Repetitions) of the UL channel, in other words, for each predetermined number of Repetitions.

When the joint channel estimation in the gNB 100 is applied, in the case where transmissions of UL channels (PUSCH and PUCCH) overlap (which may be expressed as a case of collision), the control unit 270 may determine a pattern (hopping pattern) of frequency hopping using an allocable resource avoiding the overlap, at the time of resource allocation (which may be a Repetition) of the UL channels, specifically at the timing of DCI reception.

Alternatively, in the case where transmissions of UL channels (PUSCH and PUCCH) overlap, the control unit 270 may determine a hopping pattern using an allocable resource avoiding the overlap, at the time of the first Repetition of the UL channels, specifically at the timing of the transmission of the first Repetition.

The control unit 270 may also configure a hopping pattern for the Repetition of a UL channel as described above, on the basis of a signaling from the network.

The control unit 270 may determine the allocation of a DMRS transmitted on a UL channel, specifically on a PUSCH, on the basis of the repetition status of the PUSCH, that is, the number of Repetitions, the Repetition duration, or the like.

Specifically, the control unit 270 may transmit the same DMRS symbol (OFDM symbol) for each predetermined number of Repetitions. The control unit 270 may configure a symbol for DMRS to be used (OFDM symbol) for each predetermined number of Repetitions.

The control unit 270 may determine, when the above-described specific duration greater than or equal to multiple slots (hereinafter referred to as TDW) is not indicated, the length of the TDW on the basis of the number of transmissions of the UL channel or the number of slots allocated for the uplink channel. The length of the TDW (time length) may be specified by the number of slots, the number of symbols, or the like, or by a specific time. The UL channel may mean a PUSCH, and may include a PUCCH.

The control unit 270 may determine, on the basis of the length of the TDW, a Resource Block (RB) to be used during hopping in the frequency direction of a UL channel (PUSCH and/or PUCCH, hereinafter the same). Note that the RB may be a Resource Block Group (RBG), a subcarrier, a BWP, or the like.

Alternatively, the control unit 270 may determine at least either the start or end position of the TDW on the basis of a resource block to be used during hopping in the frequency direction of a UL channel. The start or end position of the TDW may be indicated by a slot, but in the time direction, it may be indicated according to another criterion such as a symbol.

The control unit 270 may start the TDW on the first Transmission Occasion of the UL channel or at the timing of the initial transmission of the UL channel. Note that the TDW may be a Configured TDW or an actual TDW (details will be described below).

The functions regarding DMRS transmission/reception and control described above may also be provided in the gNB 100. For example, the gNB 100 (radio signal transmission and reception unit 210) may constitute a reception unit that receives a UL channel which is repeatedly transmitted from the UE 200 in a specific duration. The radio signal transmission and reception unit 210 of the gNB 100 may receive a UL channel which has hopped in the frequency direction in units of a specific duration.

Further, the gNB 100 (radio signal transmission and reception unit 210) may receive repetition transmissions, that is, a UL channel (for example, a PUSCH) on which Repetition is performed, from the UE 200 a specific number of times. In this case, the gNB 100 (radio signal transmission and reception unit 210) may receive a UL channel which has hopped in the frequency direction in units of the specific number of repetitions.

The gNB 100 (control unit 270) may constitute a control unit that performs, using a DMRS allocated to multiple slots, channel estimation of a UL channel, for example, a PUSCH, allocated to multiple slots (Joint channel estimation).

The gNB 100 (control unit 270) may perform, using a DMRS allocated to multiple slots, channel estimation of a UL channel (for example, a PUSCH) allocated to the multiple slots (Joint channel estimation).

The gNB 100 (control unit 270) may also perform, using a DMRS allocated to multiple slots, (Joint channel estimation) of a UL channel in the initial access of the UE 200, specifically, in a random access procedure.

(3) Operation of the Radio Communication System

Next, the operation of the radio communication system 10 will be described. Specifically, the operation regarding channel estimation of an uplink channel for the purpose of coverage performance will be described.

(3.1) Assumptions

As described above, Joint channel estimation may be interpreted as a technique for performing channel estimation on the basis of a DMRS present in (allocated to) multiple slots.

Further, a TDW (Time Domain Window) may be interpreted as a section where a UE transmits a signal while maintaining continuity of power and phase to enable Joint channel estimation to be performed by a radio base station (gNB).

Specifically, in order to maintain phase continuity of a transmission signal (channel) in a TDW, the following conditions may be satisfied.

- Modulation orders are the same.
- Frequency bands to which resources are allocated are the same.
- The same beam is applied during transmission.
- A Timing Advance (TA) value having the same value is applied when signals are transmitted.

These allow the gNB to apply Joint channel estimation in a TDW.

Figure 4:
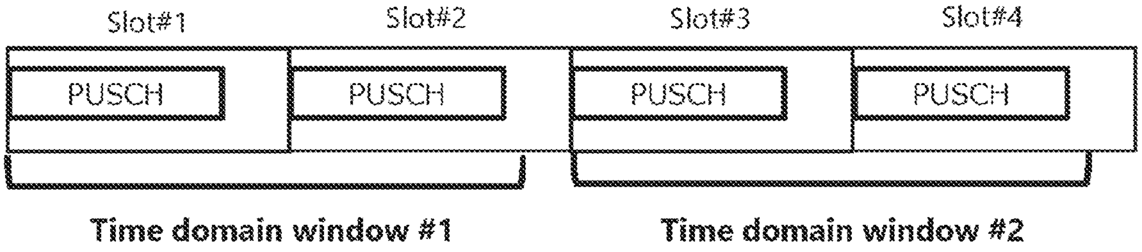
FIG. 4 is a diagram illustrating a configuration example of TDWs.

FIG. 4 illustrates a configuration example of a TDW. Specifically, FIG. 4 illustrates an example in which a PUSCH is repeatedly transmitted in four slots and the TDW extends over two slots.

For the TDW, a Configured TDW and an Actual TDW may be defined. Specifically, they may be defined as follows.

- Configured TDW
- Starting position: the starting position of the first Configured TDW is the first PUSCH transmission. The starting position of another Configured TDW follows the first Configured TDW. The starting position of the other Configured TDW may also be determined prior to the first PUSCH transmission.
- End position: the position at which a Window Length (L), which is a Configured length, has elapsed from the start point. When an event occurs, the Configured TDW may terminate.
- Actual TDW
  - A section in which a UE actually performs transmission while maintaining continuity of power and phase.
  - Multiple Actual TDWs may be included in in a single Configured TDW.
  - When an event occurs, the Actual TDW terminates, and it is determined according to UE capability whether the Actual TDW is restarted in the same Configured TDW.

The event may include a semi-static event (Event A) and a dynamic event (Event B). The semi-static event may be interpreted as an event that affects the determination of the Configured TDW, and the dynamic event may be interpreted as an event that affects the determination of the Actual TDW.

Figure 5:
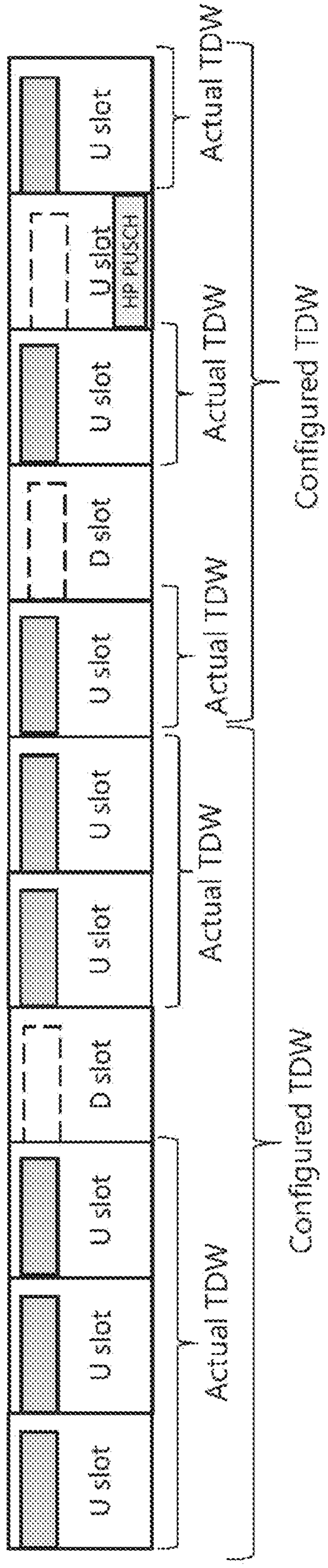
FIG. 5 is a diagram illustrating a configuration example of Configured TDWs and actual TDWs.

FIG. 5 illustrates a configuration example of Configured TDWs and Actual TDWs. As illustrated in FIG. 5, multiple Actual TDWs may be included in a single Configured TDW. Also, as illustrated in FIG. 5, the Actual TDW may terminate when it collides with one of the events, a high priority (HP) PUSCH.

Figure 6:
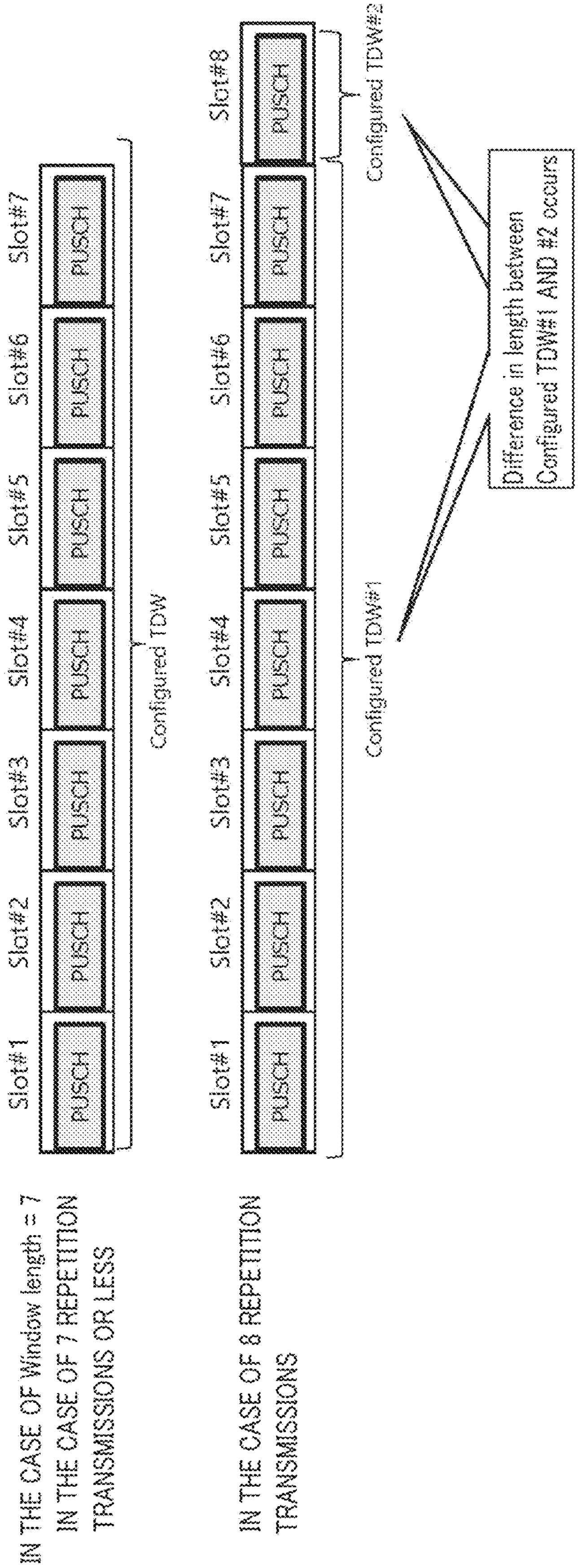
FIG. 6 is a diagram illustrating an example of the length (Window length) of Configured TDWs.

FIG. 6 illustrates an example of the length (Window Length) of Configured TDW. Specifically, FIG. 6 illustrates an example in which the Window Length of the Configured TDW is 7 (slots) and the Window Length of the Configured TDW is 8 (slots).

Here, considering the case where the Window Length is not specified (not explicitly indicated) and Joint channel estimation is applied, the default value of the Window Length may be provided.

Also, when the value of the Window Length is determined on the basis of a single-valued RRC parameter, the length may be different between Configured TDWs depending on the allocated TDRA of a PUSCH.

Here, when a TDW is long, the update of the power/frequency calibration/TA may be delayed. When the gain of Joint channel estimation is the same, it is desirable to shorten the length of the TDW as much as possible. Thus, when there are multiple Configured TDWs, it is desirable that the lengths of the Configured TDWs be equal so as not to generate a section where the update is delayed.

That is, in order for the gNB to perform channel estimation across multiple slots in the Joint channel estimation of a UL channel such as a PUSCH, it is necessary to design a duration (TDW) for transmitting a signal while maintaining continuity of power and phase.

It is thus necessary to consider the following matters.

- A determination method of the default length of a Configured TDW
- A determination method of an enhanced frequency hopping pattern and a determination method of a Configured TDW when the determination method is applied
- Starting position of a Configured TDW of a CG-PUSCH (3.2) Operation Example In the following, operation examples based on the above-mentioned considerations will be described.

(3.2.1) Operation Example 1

This operation example describes a determination method of the default TDW length (window length). When the window length is not explicitly specified by the network, the UE 200 may determine the window length as follows.

(Opt 1): Determined on the basis of UE capability

For example, the maximum value of a TDW (which may be rephrased as a maximum duration) reported by the UE 200 may be determined as the window length.

(Opt 2): Determined on the basis of the number of PUSCH repetition transmissions or the number of slots allocated by a resource For example, the number of slots to which a PUSCH resource is allocated may be determined as the window length. In this case, the number of slots to which the resource is allocated may be replaced by "the number of symbols to which the resource is allocated" or "the number of symbols between the first transmission occasion and the last transmission occasion".

(Opt 1) and (Opt 2) can improve the gain of Joint channel estimation due to a long TDW.

(Opt 3): Determined on the basis of UE capability, and the number of PUSCH repetition transmissions or the number of resource-allocated slots For example, when the number of resource-allocated slots≤maximum duration, the maximum duration may be determined as the window length.

When the number of resource-allocated slots>maximum duration, the window length may be determined as window length=ceiling ((the number of resource-allocated slots)/(variable X)). In this case, the variable X may be a value determined by a predetermined rule, or determined as X=ceiling ((the number of resource-allocated slots)/(maximum duration)). In this case, the number of resource-allocated slots may be replaced by "the number of resource-allocated symbols" or "the number of symbols between the first transmission occasion and the last transmission occasion".

(Opt 3) can determine the window length in such a manner that there is less difference in length between Configured TDWs.

Figure 7:
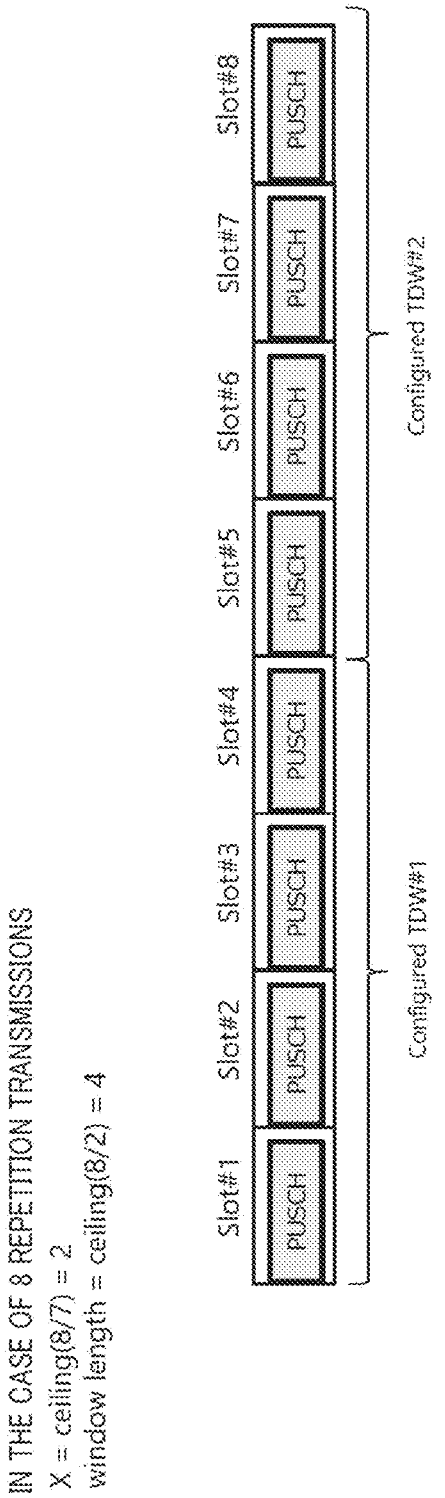
FIG. 7 is a diagram illustrating a determination example of the TDW length (window length) according to operation example 1.

FIG. 7 illustrates a determination example of the TDW length (window length) according to operation example 1. Specifically, FIG. 7 illustrates an example in which maximum duration=7 slots in (Opt 3). Here, when a PUSCH is repeatedly transmitted 8 times, it may be determined that X=ceiling (8/7)=2 and window length=ceiling (8/2)=4.

Note that the operation example 1 may be applied not only to PUSCH transmission but also to PUCCH transmission.

(3.2.2) Operation Example 2

This operation example describes an operation regarding Enhanced frequency hopping.

(3.2.2.1) Operation Example 2-1

The UE 200 may determine, on the basis of a Configured TDW, a resource block (RB) to be used for transmission when frequency hopping (FH) is applied.

For example, the UE 200 may determine, on the basis of a Configured TDW, the starting RB value for each slot/repetition when FH is applied.

Specifically, when the frequency is hopped in a slot/repetition where the Configured TDW starts, the frequency may be changed on the basis of the following equation.

$$RB_{start}(n_s^{\mu}) = \begin{cases} RB_{start} & nX1 \bmod 2 = 0^{*} \\ (RB_{start} + RB_{offset}) \bmod N_{BWP}^{size} & nX1 \bmod 2 = 1 \end{cases} \quad \text{[Math. 1]}$$

$nX1 \bmod 2 = 0$($nX1$ is the value corresponding to each configured $TDW$. For example, index.)

Figure 8:
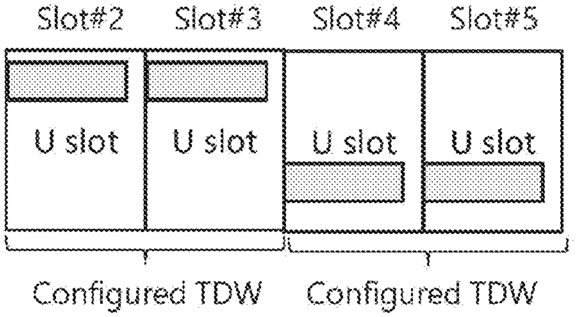
FIG. 8 is a diagram illustrating an example of frequency hopping according to operation example 2-1.

FIG. 8 illustrates an example of frequency hopping according to operation example 2-1. Specifically, FIG. 8 illustrates an example in which window length=2 and the determination order is Configured TDW≥Frequency hopping pattern.

In the example in FIG. 8, frequency hopping is performed for each Configured TDW, and thus the high gain of joint channel estimation can be expected.

(3.2.2.2) Operation Example 2-2

The UE 200 may determine the start/end position of each Configured TDW on the basis of an allocated RB when FH is applied.

For example, the UE 200 may determine the starting position of each Configured TDW on the basis of each slot/repetition where the frequency is hopped when the FH is applied. Specifically, the UE 200 may determine the start/end position of each Configured TDW as follows.

(Opt 1) a Configured TDW is started from a slot where the frequency is hopped.

For example, when the frequency is hopped at an odd or even slot number, the Configured TDW may be started at that timing.

Figure 9:
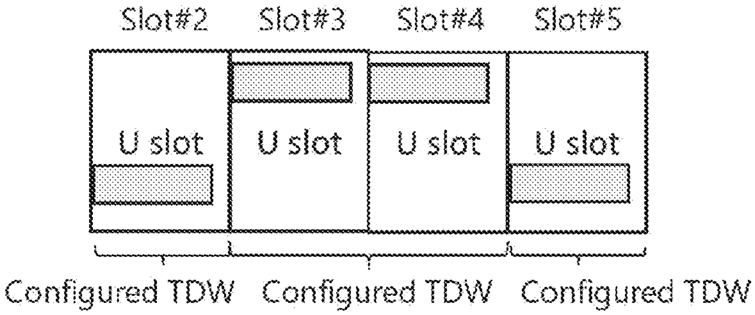
FIG. 9 is a diagram illustrating an example of frequency hopping according to operation example 2-2.

FIG. 9 illustrates an example of frequency hopping according to operation example 2-2. Specifically, FIG. 9 illustrates an example in which the frequency is hopped at odd slot numbers with duration per hop=2.

In the example in FIG. 9, the determination order is frequency hopping pattern≥Configured TDW, and thus when the duration per hop is the same, the frequency is hopped at the same timing regardless of the PUSCH transmission starting position, thereby facilitating multiplexing between UEs.

(Opt2): a Configured TDW is started in a repetition where the frequency is hopped.

For example, the frequency may be changed on the basis of the following equation.

$$RB_{start}(n_s^{\mu}) = \begin{cases} RB_{start} \\ (RB_{start} + RB_{offset}) \bmod N_{BWP}^{size} \end{cases} \quad \text{[Math. 2]}$$

$$\text{ceil}(nX2/nX3) \bmod 1 = 0 \;\; \text{floor}(nX2/nX3) \bmod 1 = 0$$

or $$\text{ceil}(nX2/nX3) \bmod 1 = 1 \;\; \text{floor}(nX2/nX3) \bmod 1 = 1$$

Note that n×1 indicates the slot number in (Opt 1) and indicates the index of repetition or nominal repetition in (Opt 2). n×3 indicates the duration per hop.

Note that the operation examples 2-1 and 2-2 may be applied not only to PUSCH transmission but also to PUCCH transmission. Also, an Actual TDW may be applied instead of a Configured TDW.

(3.2.3) Operation Example 3

This operation example describes an operation regarding PUSCH transmission timing of the UE 200 when a Configured grant (CG)-PUSCH is repeatedly transmitted.

Here, it is assumed that when RV (Redundancy Version) sequence {0,0,0,0} or {0,3,0,3} is selected regarding the initial transmission timing of the UE 200 and startingFromRV0 is on, the initial transmission of a PUSCH is possible at a transmission occasion corresponding to RV=0 (see 3GPP TS 38.214 Chapter 6.1.2.3.1).

In addition, the UE 200 may determine the transmission end timing of the CG-PUSCH as one of the following.

- Completion of the configured number of repetition transmissions by the UE 200
- Completion of transmission at the last transmission occasion in a periodicity P
- Duplication of transmissions with a PUSCH for the same HARQ process scheduled by DCI formats 0_0, 0_1, 0_2
- Reception of DCI with DFI (Downlink Feedback Information) flag in DCI format 0_1 and detection of ACK in the corresponding HARQ process The UE 200 may determine the starting position of a Configured TDW of a CG-PUSCH as follows.

(Opt 1): a Configured TDW is started from the first transmission occasion (in a period (see FIG. 10)).

In this case, the Configured TDW may be started from the starting position of a slot where the first transmission occasion is present, or may be started from the first symbol of the transmission occasion.

In this case, any one of a slot, symbol, and transmission occasion which are determined to be transmittable on the basis of a parameter such as a TDD pattern (tdd-UL-DL-ConfigurationCommon, tdd-UL-DL-ConfigurationDedicated) or a SSB position (ssb-PositionsInBurst) may be determined as the starting position.

(Opt 2): a Configured TDW is started from the Initial transmission.

In this case, a Configured TDW may be started from the initial transmission where the UE 200 has actually transmitted a PUSCH. The UE 200 may also start the Configured TDW from the slot starting position of the initial transmission, or may start the Configured TDW from the first symbol of the initial transmission.

Figure 10:
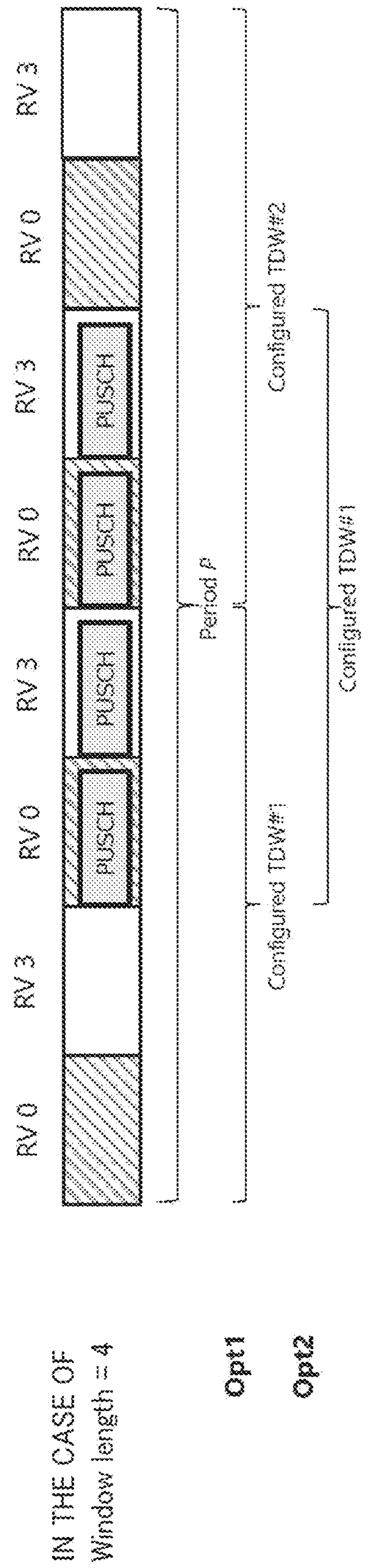
FIG. 10 is a diagram illustrating a determination example of the starting position of a Configured TDW according to operation example 3.

FIG. 10 illustrates a determination example of the starting position of a Configured TDW according to operation example 3. Specifically, FIG. 10 illustrates an example (Opt1, Opt2) in which window length=4 and a PUSCH is repeatedly transmitted in a period P.

The UE 200 can start initial transmission from slots shaded with a diagonal line (RV 0). As described above, in the case of (Opt 1), a Configured TDW may be started from the first transmission occasion, and in the case of (Opt 2), a Configured TDW may be started from the Initial transmission.

In the case of (Opt 2), the UE 200 may also notify the gNB 100 of information indicating which transmission occasion is the initial transmission using any of the following methods.

(Opt A): Uplink Control Information (UCI) is multiplexed to a PUSCH and whether it is initial transmission or not is notified by UCI.

In this case, the UE 200 may notify using UCI whether Joint channel estimation with the previous slot is possible or not (whether or not a TDW condition is met) and, on the basis of the notification, may notify the gNB 100 of information indicating which transmission occasion corresponds to the initial transmission.

(Opt B): whether it is the initial transmission or not is notified on the basis of a DMRS port and/or a DMRS resource of a PUSCH to be transmitted.

In this case, the UE 200 may notify whether Joint channel estimation with the previous slot is possible with the DMRS port and/or DMRS resource (whether or not a TDW condition is met) and, on the basis of the notification, may implicitly notify the gNB 100 of information indicating which transmission occasion corresponds to the initial transmission.

The UE 200 may also determine whether to apply (Opt 1) or (Opt 2) on the basis of a parameter configured by the RRC.

(3.2.4) Operation Example 4

This operation example describes an operation regarding notification of UE capability. The UE 200 may report to a network the following information regarding a TDW as UE capability information.

Applicability of each operation example

Applicability of each operation example option (Opt)

The UE 200 may report the corresponding (supported) frequency (may be FR or band) using one of the following methods.

Support availability of all frequencies at once (support availability as a UE)

Support availability of each frequency

Support availability of each FR1/FR2

Support availability of each SCS

Further, the UE 200 may report a corresponding duplex system using any of the following methods.

Support availability as a UE

Support availability of each duplex system (TDD/FDD)

(4) Actions and Effects

According to the above-described embodiment, the following actions and effects can be obtained. In the gNB 100 and UE 200 according to the above-described operation examples 1 to 4, an appropriate TDW can be configured even when Joint channel estimation of a UL channel is applied. Thus, the gNB 100 can accurately perform Joint channel estimation in a TDW for transmitting a signal while maintaining continuity of power and phase.

That is, the gNB 100 and UE 200 can more efficiently perform channel estimation of a UL channel such as a PUSCH using a DMRS that can be present in multiple slots.

(5) Other Embodiments

Although the contents of the present invention have been described in accordance with the embodiment, the present invention is not limited to these descriptions, and it is obvious to those skilled in the art that various modifications and improvements thereof are possible.

For example, although the demodulation reference signal (DMRS) used for channel estimation of a PUSCH (or PUCCH) has been described in the above-described embodiment, another reference signal may be used as long as it is a reference signal used for channel estimation of a physical channel such as a PUSCH (or PUCCH).

In the above description, configure, activate, update, indicate, enable, specify, and select may be interchangeably interpreted. Similarly, link, associate, correspond, and map may be interchangeably interpreted, and allocate, assign, monitor, and map may also be interchangeably interpreted.

In addition, specific, dedicated, UE-specific, and UE-dedicated may be interchangeably interpreted. Similarly, common, shared, group-common, UE-common, and UE-shared may be interchangeably interpreted.

The block diagram (FIG. 3) used in the description of the above-described embodiment illustrates blocks in units of functions. Those functional blocks (components) can be realized by any combination of at least one of hardware and software. A realization method for each functional block is not particularly limited. That is, each functional block may be realized by using one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that makes a transmitting function work may be called a transmitting unit or a transmitter. For any of the above, as described above, the realization method is not particularly limited.

Figure 11:
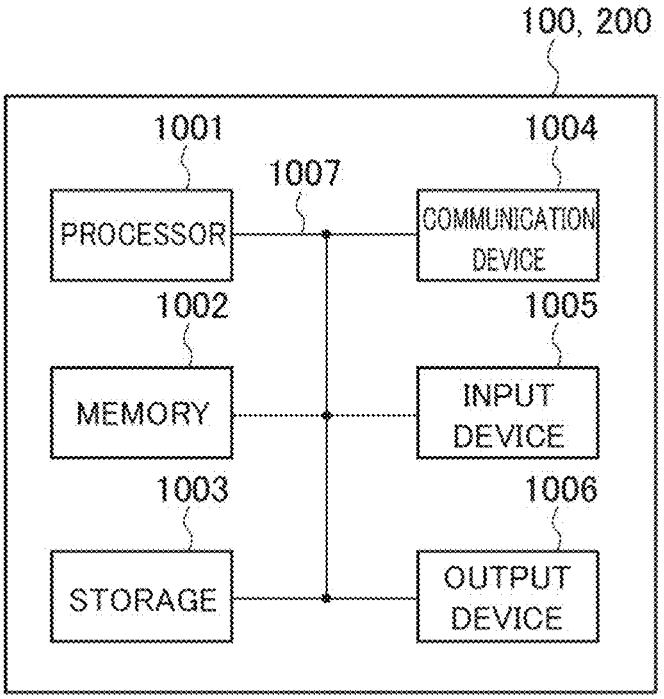
FIG. 11 is a diagram illustrating a hardware configuration example of the gNB 100 and the UE 200.

Further, the above-described gNB 100 and UE 200 (the device) may function as a computer that performs processing of a radio communication method of the present disclosure. FIG. 11 is a diagram illustrating an example of a hardware configuration of the device. As illustrated in FIG. 9, the device may be configured as a computer device including a processor 1001, a memory 1002, a storage 1003, a communication device 1004, an input device 1005, an output device 1006, a bus 1007, and the like.

Furthermore, in the following description, the term "device" can be read as meaning circuit, device, unit, or the like. The hardware configuration of the device may include one or more devices illustrated in the figure or may not include some of the devices.

Each of the functional blocks of the device (FIG. 3) is implemented by means of any of hardware elements of the computer device or a combination of the hardware elements.

Each function in the device is realized by loading predetermined software (programs) on hardware such as the processor 1001 and the memory 1002 so that the processor 1001 performs arithmetic operations to control communication via the communication device 1004 and to control at least one of reading and writing of data on the memory 1002 and the storage 1003.

The processor 1001 operates, for example, an operating system to control the entire computer. The processor 1001 may be configured with a central processing unit (CPU) including interfaces with peripheral devices, control devices, arithmetic devices, registers, and the like.

Moreover, the processor 1001 reads a program (program code), a software module, data, and the like from at least one of the storage 1003 and the communication device 1004 into the memory 1002, and executes various processes according to these. As the program, a program causing the computer to execute at least part of the operation described in the above embodiment is used. Alternatively, various processes described above may be executed by one processor 1001 or may be executed simultaneously or sequentially by two or more processors 1001. The processor 1001 may be implemented by using one or more chips. Alternatively, the program may be transmitted from a network via a telecommunication line.

The memory 1002 is a computer readable recording medium and may be configured, for example, with at least one of a Read Only Memory (ROM), Erasable Programmable ROM (EPROM), Electrically Erasable Programmable ROM (EEPROM), Random Access Memory (RAM), and the like. The memory 1002 may be referred to as a register, cache, main memory (main storage device), and the like. The memory 1002 may store therein programs (program codes), software modules, and the like that can execute the method according to one embodiment of the present disclosure.

The storage 1003 is a computer readable recording medium. Examples of the storage 1003 include at least one of an optical disk such as Compact Disc ROM (CD-ROM), a hard disk drive, a flexible disk, a magneto-optical disk (for example, a compact disk, a digital versatile disk, Blu-ray (registered trademark) disk), a smart card, a flash memory (for example, a card, a stick, a key drive), a floppy (registered trademark) disk, a magnetic strip, and the like. The storage 1003 may be referred to as an auxiliary storage device. The recording medium may be, for example, a database including at least one of the memory 1002 and the storage 1003, a server, or other appropriate medium.

The communication device 1004 is hardware (transmission/reception device) capable of performing communication between computers via at least one of a wired network and a wireless network. The communication device 1004 is also referred to as, for example, a network device, a network controller, a network card, a communication module, and the like.

The communication device 1004 may include a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may have an integrated configuration (for example, a touch screen).

Also, the respective devices such as the processor 1001 and the memory 1002 are connected to each other with the bus 1007 for communicating information. The bus 1007 may be constituted by a single bus or may be constituted by different buses for each device-to-device.

Further, the device may be configured to include hardware such as a microprocessor, a Digital Signal Processor (DSP), an Application Specific Integrated Circuit (ASIC), a Programmable Logic Device (PLD), and a Field Programmable Gate Array (FPGA). Some or all of these functional blocks may be realized by means of this hardware. For example, the processor 1001 may be implemented by using at least one of the above-described items of hardware.

Further, notification of information is not limited to that in the aspect/embodiment described in the present disclosure, and may be performed by using other methods. For example, notification of information may be performed by physical layer signaling (for example, Downlink Control Information (DCI), Uplink Control Information (UCI), higher layer signaling (for example, RRC signaling, Medium Access Control (MAC) signaling), broadcast information (Master Information Block (MIB), System Information Block (SIB)), other signals, or a combination thereof. The RRC signaling may also be referred to as an RRC message, for example, or may be an RRC Connection Setup message, an RRC Connection Reconfiguration message, or the like.

Each aspect/embodiment described in the present disclosure may be applied to at least one of Long Term Evolution (LTE), LTE-Advanced (LTE-A), SUPER 3G, IMT-Advanced, the 4th generation mobile communication system (4G), the 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), a system using any other appropriate system, and a next-generation system that is expanded based on these. Further, a plurality of systems may be combined (for example, a combination of at least one of LTE and LTE-A with 5G) and applied.

The order of the processing procedures, sequences, flowcharts, and the like of each aspect/embodiment described in the present disclosure may be exchanged as long as there is no contradiction. For example, the methods described in the present disclosure present the elements of the various steps by using an exemplary order and are not limited to the presented specific order.

The specific operation that is performed by a base station in the present disclosure may be performed by its upper node in some cases. In a network constituted by one or more network nodes having a base station, it is obvious that the various operations performed for communication with the terminal may be performed by at least one of the base station and other network nodes other than the base station (for example, an MME, an S-GW, and the like may be considered, but there is not limited thereto). In the above, an example in which there is one network node other than the base station is explained; however, a combination of a plurality of other network nodes (for example, an MME and an S-GW) may be used.

Information and signals (information and the like) can be output from a higher layer (or lower layer) to a lower layer (or higher layer). These may be input and output via a plurality of network nodes.

The input/output information may be stored in a specific location (for example, a memory) or may be managed in a management table. The information to be input/output can be overwritten, updated, or added. The information may be deleted after outputting. The inputted information may be transmitted to another device.

The determination may be made by using a value (0 or 1) represented by one bit, by truth-value (Boolean: true or false), or by comparison of numerical values (for example, comparison with a predetermined value).

Each of the aspects/embodiment described in the present disclosure may be used separately or in combination, or may be switched in accordance with the execution. In addition, notification of predetermined information (for example, notification of "is X") is not limited to being performed explicitly, and it may be performed implicitly (for example, without notifying the predetermined information).

Regardless of being referred to as software, firmware, middleware, microcode, hardware description language, or some other name, software should be interpreted broadly to mean instructions, an instruction set, code, a code segment, program code, a program, a subprogram, a software module, an application, a software application, a software package, a routine, a subroutine, an object, an executable file, an execution thread, a procedure, a function, and the like.

Further, software, instruction, information, and the like may be transmitted and received via a transmission medium. For example, when software is transmitted from a website, a server, or another remote source by using at least one of a wired technology (a coaxial cable, an optical fiber cable, a twisted pair cable, a Digital Subscriber Line (DSL), or the like) and a wireless technology (infrared light, microwave, or the like), then at least one of these wired and wireless technologies is included within the definition of the transmission medium.

Information, signals, or the like described in the present disclosure may be represented by using any of a variety of different technologies. For example, data, an instruction, a command, information, a signal, a bit, a symbol, a chip, or the like that may be mentioned throughout the above description may be represented by a voltage, a current, an electromagnetic wave, a magnetic field or magnetic particles, an optical field or photons, or any combination thereof.

It should be noted that the terms described in the present disclosure and terms necessary for understanding the present disclosure may be replaced with terms having the same or similar meanings. For example, at least one of a channel and a symbol may be a signal (signaling). A signal may also be a message. Further, a Component Carrier (CC) may be referred to as a carrier frequency, a cell, a frequency carrier, or the like.

The terms "system" and "network" used in the present disclosure can be used interchangeably.

Furthermore, information, parameters, and the like described in the present disclosure may be represented by an absolute value, may be represented by a relative value from a predetermined value, or may be represented by corresponding other information. For example, a radio resource may be indicated using an index.

Names used for the above parameters are not restrictive names in any respect. In addition, formulas and the like using these parameters may be different from those explicitly disclosed in the present disclosure. Since the various channels (for example, a PUCCH, a PDCCH, or the like) and information elements can be identified by any suitable names, the various names allocated to these various channels and information elements shall not be restricted in any way.

In the present disclosure, the terms such as "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. A base station may also be referred to with a term such as a macro cell, a small cell, a femtocell, or a pico cell.

A base station can accommodate one or more (for example, three) cells (also referred to as sectors). In a configuration in which a base station accommodates a plurality of cells, the entire coverage area of the base station can be divided into a plurality of smaller areas. In each of the smaller areas, a communication service can be provided by a base station subsystem (for example, a small base station for indoor use (remote radio head: RRH)).

The term "cell" or "sector" refers to a part or all of the coverage area of at least one of a base station and a base station subsystem that performs a communication service in this coverage.

In the present disclosure, the terms such as "mobile station (Mobile Station: MS)", "user terminal", "user equipment (User Equipment: UE)", and "terminal" can be used interchangeably.

A mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms by those skilled in the art.

At least one of a base station and a mobile station may be called a transmitting device, a receiving device, a communication device, or the like. Note that at least one of a base station and a mobile station may be a device mounted on a moving body, a moving body itself, or the like. The moving body may be a vehicle (for example, a car, an airplane, or the like), an unmanned moving body (a drone, a self-driving car, or the like), or a robot (manned type or unmanned type). At least one of a base station and a mobile station also includes a device that does not necessarily move during the communication operation. For example, at least one of a base station and a mobile station may be an Internet of Things (IoT) device such as a sensor.

Also, a base station in the present disclosure may be read as meaning a mobile station (user terminal, hereinafter, the same). For example, each aspect/embodiment of the present disclosure may be applied to a configuration in which communication between a base station and a mobile station is replaced with communication between a plurality of mobile stations (which may be called Device-to-Device (D2D), Vehicle-to-Everything (V2X), or the like). In this case, the mobile station may have the function of a base station. In addition, words such as "uplink" and "downlink" may also be read as meaning words corresponding to inter-terminal communication (for example, "side"). For example, an uplink channel, a downlink channel, or the like may be read as meaning a side channel.

Similarly, the mobile station in the present disclosure may be read as meaning a base station. In this case, the base station may have the function of the mobile station.

A radio frame may be composed of one or more frames in the time domain.

Each of the one or more frames in the time domain may be referred to as a subframe. A subframe may be further composed of one or more slots in the time domain.

The subframe may be a fixed time length (for example, 1 ms) independent of the numerology.

The numerology may be a communication parameter applied to at least one of transmission and reception of a certain signal or channel. The numerology may indicate at least one of, for example, SubCarrier Spacing (SCS), bandwidth, symbol length, cyclic prefix length, Transmission Time Interval (TTI), the number of symbols per TTI, radio frame configuration, a specific filtering process performed by a transceiver in the frequency domain, a specific windowing process performed by a transceiver in the time domain, and the like.

A slot may be composed of one or more symbols (Orthogonal Frequency Division Multiplexing (OFDM)) symbols, Single Carrier Frequency Division Multiple Access (SC-FDMA) symbols, and the like) in the time domain. A slot may be a unit of time based on the numerology.

A slot may include a plurality of minislots. Each minislot may be composed of one or more symbols in the time domain. A minislot may be called a subslot. A minislot may be composed of fewer symbols than slots. A PDSCH (or PUSCH) transmitted in time units greater than the minislot may be referred to as a PDSCH (or PUSCH) mapping type A. A PDSCH (or PUSCH) transmitted using a minislot may be referred to as a PDSCH (or PUSCH) mapping type B.

Each of a radio frame, subframe, slot, minislot, and symbol represents a time unit for transmitting a signal. A radio frame, subframe, slot, minislot, and symbol may have respectively different names corresponding to them.

For example, one subframe may be called a Transmission Time Interval (TTI), a plurality of consecutive subframes may be called a TTI, and one slot or one minislot may be called a TTI. That is, at least one of the subframe and TTI may be a subframe (1 ms) in the existing LTE, a period shorter than 1 ms (for example, 1 to 13 symbols), or a period longer than 1 ms. Note that, a unit representing TTI may be called a slot, a minislot, or the like instead of a subframe.

Here, a TTI refers to the minimum time unit of scheduling in radio communication, for example. For example, in the LTE system, the base station performs scheduling for allocating radio resources (frequency bandwidth, transmission power, and the like that can be used in each user terminal) to each user terminal in units of TTI. The definition of TTI is not limited to this.

A TTI may be a transmission time unit such as a channel-coded data packet (transport block), a code block, or a code word, or may be a processing unit such as scheduling or link adaptation. When a TTI is given, a time interval (for example, the number of symbols) in which a transport block, a code block, a code word, and the like are actually mapped may be shorter than TTI.

When one slot or one minislot is called a TTI, one or more TTIs (that is, one or more slots or one or more minislots) may be the minimum time unit of the scheduling. The number of slots (minislot number) constituting the minimum time unit of the scheduling may be controlled.

A TTI having a time length of 1 ms may be referred to as an ordinary TTI (TTI in LTE Rel. 8-12), a normal TTI, a long TTI, an ordinary subframe, a normal subframe, a long subframe, a slot, and the like. A TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, and the like) may be read as meaning a TTI having a time length exceeding 1 ms, and a short TTI (for example, shortened TTI) may be read as meaning a TTI having a TTI length of less than a TTI length of a long TTI and a TTI length of 1 ms or more.

A resource block (RB) is a resource allocation unit in the time domain and the frequency domain, and may include one or more consecutive subcarriers in the frequency domain.

The number of subcarriers included in the RB may be the same regardless of the numerology, and may be 12, for example. The number of subcarriers included in the RB may be determined based on the numerology.

Further, the time domain of an RB may include one or more symbols, and may have a length of 1 slot, 1 minislot, 1 subframe, or 1 TTI. Each TTI, subframe, or the like may be composed of one or more resource blocks.

Note that, one or more RBs may be called a physical resource block (PRB), a subcarrier group (SCG), a resource element group (REG), a PRB pair, a RB pair, and the like.

A resource block may be configured by one or more resource elements (REs). For example, one RE may be a radio resource domain of one subcarrier and one symbol.

A Bandwidth Part (BWP) (which may be called a partial bandwidth or the like) may represent a subset of consecutive common resource blocks (RBs) for a certain numerology in a certain carrier. Here, the common RB may be specified by an index of the RB based on the common reference point of the carrier. A PRB may be defined in a certain BWP and numbered within that BWP.

A BWP may include a BWP for UL (UL BWP) and a BWP for DL (DL BWP). One or more BWPs may be configured in one carrier for the UE.

At least one of the configured BWPs may be active, and the UE does not have to expect to transmit and receive predetermined signals/channels outside the active BWP. Note that "cell", "carrier", and the like in this disclosure may be read as meaning "BWP".

The above-described structures such as a radio frame, a subframe, a slot, a minislot, and a symbol are merely examples. For example, structures such as the number of subframes included in a radio frame, the number of slots per subframe or radio frame, the number of minislots included in a slot, the number of symbols and RBs included in a slot or minislot, the number of subcarriers included in RBs, and the number of symbols included in a TTI, a symbol length, the Cyclic Prefix (CP) length, and the like can be changed in various manner.

The terms "connected", "coupled", or any variations thereof mean any direct or indirect connection or coupling between two or more elements, and can include that one or more intermediate elements are present between two elements that are "connected" or "coupled" to each other. The coupling or connection between the elements may be physical, logical, or a combination thereof. For example, "connection" may be read as meaning "access". In the present disclosure, two elements can be "connected" or "coupled" to each other by using at least one of one or more wires, one or more cables, and one or more printed electrical connections, and as some non-limiting and non-exhaustive examples, by using electromagnetic energy having wavelengths in the radio frequency domain, a microwave region, and a light (both visible and invisible) region, and the like.

A Reference Signal may be abbreviated as RS and may be called a pilot according to applicable standards.

As used in the present disclosure, the phrase "based on" does not mean "based only on" unless explicitly stated otherwise. In other words, the phrase "based on" means both "based only on" and "based at least on".

"Means" in the configuration of each device above may be replaced with "unit", "circuit", "device", and the like.

Any reference to elements using a designation such as "first", "second", or the like used in the present disclosure generally does not limit the amount or order of those elements. Such designations can be used in the present disclosure as a convenient method to distinguish between two or more elements. Thus, the reference to the first and second elements does not imply that only two elements can be adopted, or that the first element has to precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive-OR.

Throughout the present disclosure, for example, during translation, if articles such as a, an, and the in English are added, the present disclosure may include that a noun following these articles is used in plural.

As used in this disclosure, the term "determining" may encompass a wide variety of actions. "determining" includes deeming that determining has been performed by, for example, judging, calculating, computing, processing, deriving, investigating, searching (looking up, search, inquiry) (for example, searching in a table, database, or another data structure), ascertaining, and the like. In addition, "determining" can include deeming that determining has been performed by receiving (for example, receiving information), transmitting (for example, transmitting information), inputting (input), outputting (output), access (accessing) (for example, accessing data in a memory), and the like. In addition, "determining" can include deeming that determining has been performed by resolving, selecting, choosing, establishing, comparing, and the like. That is, "determining" may include deeming that "determining" regarding some action has been performed. Moreover, "determining" may be read as meaning "assuming", "expecting", "considering", and the like.

In the present disclosure, the wording "A and B are different" may mean "A and B are different from each other". It should be noted that the wording may mean "A and B are each different from C". Terms such as "separate", "couple", or the like may also be interpreted in the same manner as "different".

Figure 12:
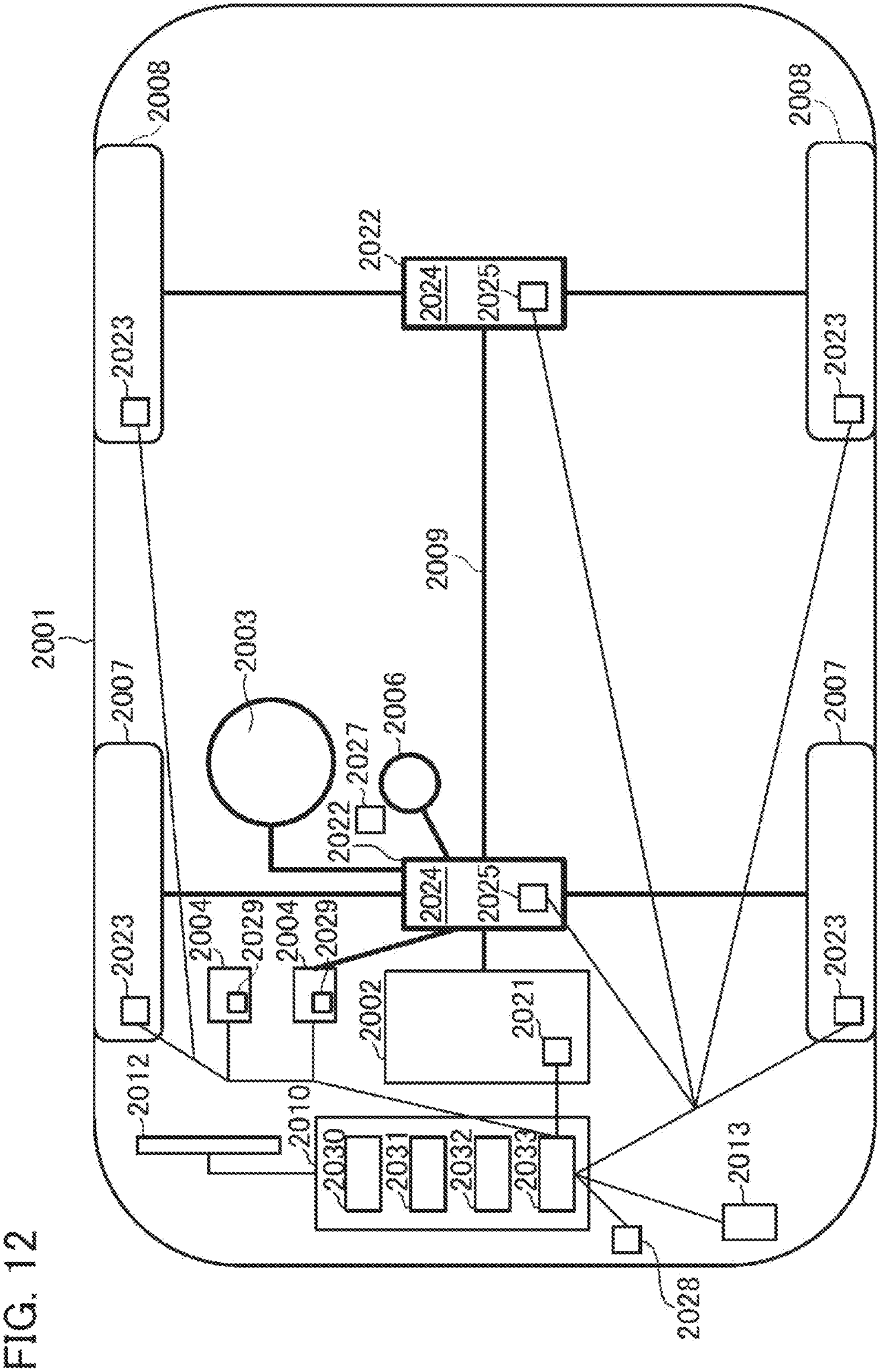
FIG. 12 is a diagram illustrating a configuration example of a vehicle 2001.

FIG. 12 shows a configuration example of a vehicle 2001. As shown in FIG. 12, the vehicle 2001 includes a drive 2002, a steering 2003, an accelerator pedal 2004, a brake pedal 2005, a shift lever 2006, left and right front wheels 2007, left and right rear wheels 2008, an axle 2009, an electronic controller 2010, various sensors 2021 to 2029, an information service unit 2012, and a communication module 2013.

Examples of the drive 2002 include, an engine, a motor, and a hybrid of an engine and a motor.

The steering 2003 includes at least a steering wheel (also called a handle) and steers at least one of the front and rear wheels based on an operation of a steering wheel operated by a user.

The electronic controller 2010 includes a microprocessor 2031, a memory (ROM, RAM) 2032, and a communication port (IO port) 2033. The electronic controller 2010 receives signals from various sensors 2021 to 2027 provided in the vehicle. The electronic controller 2010 may be called an ECU (Electronic Control Unit).

The signals from the various sensors 2021 to 2028 include a current signal from a current sensor 2021 for sensing current of a motor, a rotation speed signal of a front wheel and a rear wheel acquired by the speed sensor 2022, a pressure signal of a front wheel and a rear wheel acquired by an air pressure sensor 2023, a speed signal of a vehicle acquired by a speed sensor 2024, an acceleration signal acquired by an acceleration sensor 2025, an accelerator pedal pressed-amount signal acquired by an accelerator pedal sensor 2029, a brake pedal pressed-amount signal acquired by a brake pedal sensor 2026, an operation signal of the shift lever acquired by a shift lever sensor 2027, and a detection signal acquired by an object detection sensor 2028 for detecting obstacles, vehicles, pedestrians, and the like.

The information service unit 2012 includes various devices such as a car navigation system, an audio system, a speaker, a television, and a radio for providing various information such as driving information, traffic information, and entertainment information, and one or more ECUs for controlling these devices.

The information service unit 2012 provides various multimedia information and multimedia services to an occupant of the vehicle 1 by using information acquired from an external device through a communication module 2013 and the like.

A driver support system unit 2030 comprises various devices such as a millimeter wave radar, a Light Detection and Ranging (LiDAR), a camera, a positioning locator (for example, GNSS), map information (for example, high-definition (HD) maps, autonomous vehicle (AV) maps, and the like), a gyroscopic system (for example, an Inertial Measurement Unit (IMU), an Inertial Navigation System (INS), and the like), an Artificial Intelligence (AI) chip, and an AI processor for providing functions to prevent accidents or reduce a driving load of a driver, and one or more ECUs for controlling these devices. Further, the driver support system unit 2030 transmits and receives various kinds of information through the communication module 2013 to realize a driver support function or an automatic driving function.

The communication module 2013 can communicate with the microprocessor 2031 and components of the vehicle 1 through a communication port. For example, the communication module 2013 transmits and receives data through the communication port 2033 to and from the drive 2002, steering 2003, accelerator pedal 2004, brake pedal 2005, shift lever 2006, left and right front wheels 2007, left and right rear wheels 2008, axle 2009, microprocessor 2031 in the electronic control 2010, memory (ROM, RAM) 2032, and sensor 2021 to 2028.

The communication module 2013 is a communication device that can be controlled by the microprocessor 2031 of the electronic controller 2010 and can communicate with an external device. For example, The communication module 2013 transmits and receives various kinds of information via radio communication with the external device. The communication module 2013 may be placed inside or outside the electronic control unit 2010. Examples of the external device may include a base station, a mobile station, and the like.

The communication module 2013 transmits a current signal coming from a current sensor and input to the electronic controller 2010 to an external device via radio communication. Further, the communication module 2013 transmits a rotation speed signal of a front wheel and a rear wheel acquired by the speed sensor 2022, a pressure signal of a front wheel and a rear wheel acquired by an air pressure sensor 2023, a speed signal of a vehicle acquired by a speed sensor 2024, an acceleration signal acquired by an acceleration sensor 2025, an accelerator pedal pressed-amount signal acquired by an accelerator pedal sensor 2029, a brake pedal pressed-amount signal acquired by a brake pedal sensor 2026, an operation signal of the shift lever acquired by a shift lever sensor 2027, and a detection signal acquired by an object detection sensor 2028 for detecting obstacles, vehicles, pedestrians, and the like input to the electronic controller 2010 to an external device via radio communication.

The communication module 2013 receives various information (traffic information, signal information, inter-vehicle information, and the like.) transmitted from the external device and displays on the information service unit 2012 provided in the vehicle. Further, the communication module 2013 stores various information received from the external device in a memory 2032 usable by the microprocessor 2031. Based on the information stored in the memory 2032, the microprocessor 2031 may control the drive 2002, the steering 2003, the accelerator pedal 2004, the brake pedal 2005, the shift lever 2006, the left and right front wheels 2007, the left and right rear wheels 2008, the axle 2009, the sensors 2021 to 2028, and the like. provided in the vehicle 2001.

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN

100 gNB
110 Reception unit
200 UE
210 Radio signal transmission and reception unit
220 Amplifier unit
230 Modulation and demodulation unit
240 Control signal and reference signal processing unit
250 Encoding/decoding unit
260 Data transmission and reception unit
270 Control unit
1001 Processor
1002 Memory
1003 Storage
1004 Communication device
1005 Input device
1006 Output device
1007 Bus
2001 Vehicle
2002 Drive unit
2003 Steering unit
2004 Accelerator pedal
2005 Brake pedal
2006 Shift lever
2007 Left and right front wheels
2008 Left and right rear wheels
2009 Axle
2010 Electronic control unit
2012 Information service unit
2013 Communication module
2021 Current sensor
2022 Rotation speed sensor
2023 Air pressure sensor
2024 Vehicle speed sensor
2025 Acceleration sensor
2026 Brake pedal sensor
2027 Shift lever sensor
2028 Object detection sensor
2029 Accelerator pedal sensor
2030 Operation support system unit
2031 Microprocessor
2032 Memory (ROM, RAM)
2033 Communication port

The invention claimed is:

1. A terminal comprising:

a transmitter that transmits terminal capability information including a maximum value of a time domain window (TDW) which is a duration greater than or equal to a plurality of slots and repeatedly transmits an uplink channel in the TDW including one or more actual TDW in which the transmitter transmits the uplink channel while maintaining continuity of power and phase; and a processor that determines the TDW in which the transmitter repeatedly transmits the uplink channel, when a length of another TDW is not indicated by a higher layer signaling from a network, on the basis of: terminal capability information; and a number of transmissions of the uplink channel or a number of slots allocated for the uplink channel transmitted repeatedly.

2. A radio communication system comprising: a terminal; and a radio base station, wherein the terminal includes:

a transmitter that transmits terminal capability information including a maximum value of a time domain window (TDW) which is a duration greater than or equal to a plurality of slots and repeatedly transmits an uplink channel in the TDW including one or more actual TDW in which the transmitter transmits the uplink channel while maintaining continuity of power and phase; and a processor that determines the TDW in which the transmitter repeatedly transmits the uplink channel, when a length of another TDW is not indicated by a higher layer signaling from a network, on the basis of: terminal capability information; and a number of transmissions of the uplink channel or a number of slots allocated for the uplink channel transmitted repeatedly, and the radio base station includes a receiver that receives the uplink channel.

3. A radio communication method for a terminal, comprising:

transmitting terminal capability information including a maximum value of a time domain window (TDW) which is a duration greater than or equal to a plurality of slots and repeatedly transmitting an uplink channel in the TDW including one or more actual TDW in which the transmitter transmits the uplink channel while maintaining continuity of power and phase; and determining the TDW in which the transmitter repeatedly transmits the uplink channel, when a length of another TDW is not indicated by a higher layer signaling from a network, on the basis of: terminal capability information; and a number of transmissions of the uplink channel or a number of slots allocated for the uplink channel transmitted repeatedly.

* * * * *